United States Patent [19]

Farris

[11] 3,940,092

[45] Feb. 24, 1976

[54] JET FLOW DEFLECTOR FOR AIRCRAFT

[75] Inventor: Edsel S. Farris, Burton, Wash.

[73] Assignee: The Boeing Company, Seattle, Wash.

[22] Filed: Nov. 7, 1974

[21] Appl. No.: 521,685

[52] U.S. Cl...... 244/12 D; 244/42 CC; 239/265.19; 239/265.33
[51] Int. Cl.² .......................................... B64C 15/04
[58] Field of Search..... 239/265.31, 265.33, 265.35, 239/265.29, 265.37, 265.19, 265.17, 265; 60/226 A, 230; 244/12 A, 12 D, 13, 42 CC, 53, 12 R, 110 B, 23 B, 23 D, 42 DA, 42 CA

[56] References Cited
UNITED STATES PATENTS

| | | | |
|---|---|---|---|
| 2,654,552 | 10/1953 | Jonas | 244/12 D |
| 2,991,961 | 7/1961 | Rogallo et al. | 244/12 R |
| 3,018,983 | 1/1962 | Davidson | 244/42 CC |
| 3,241,312 | 3/1966 | Clark | 244/12 D |
| 3,241,771 | 3/1966 | Erwin | 244/23 D |
| 3,456,904 | 7/1969 | Dorand | 244/42 CC |
| 3,767,140 | 10/1973 | Johnson | 244/42 DA |
| 3,779,010 | 12/1973 | Chamay et al. | 239/265.31 |
| 3,820,719 | 6/1974 | Clark | 239/265.31 |
| 3,844,482 | 10/1974 | Stearns | 60/226 A |

Primary Examiner—Trygve M. Blix
Assistant Examiner—Galen L. Barefoot
Attorney, Agent, or Firm—Brown, Murray, Flick & Peckham

[57] ABSTRACT

A jet flow deflector is provided on an aircraft engine nacelle. In high speed cruise conditions, the deflector engages in a recess in the upper part of the nacelle and forms part of the jet nozzle, providing an efficient flow passage and an outer surface having minimum drag. For low speed flight, the deflector is moved downward and aft with respect to the nacelle to deflect the jet flow downward to increase the lift by use of the Coanda flap principle. By moving the deflector in this manner, an additional flow area is created above the deflector and at one side to increase the effective nozzle area. If desired, the deflector may be divided into two or more segments which are spaced from each other in the low speed configuration.

12 Claims, 12 Drawing Figures

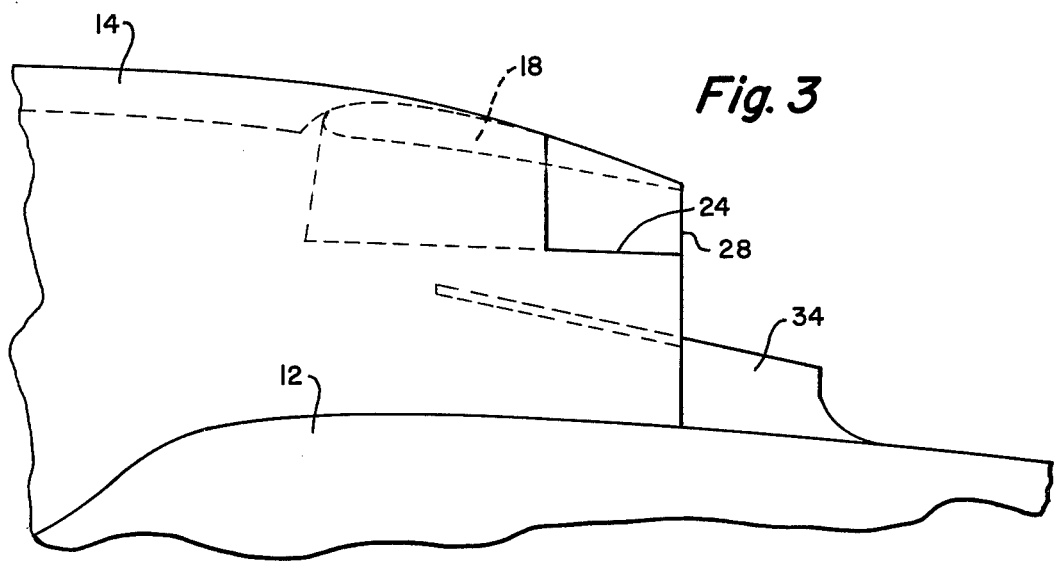
Fig. 3
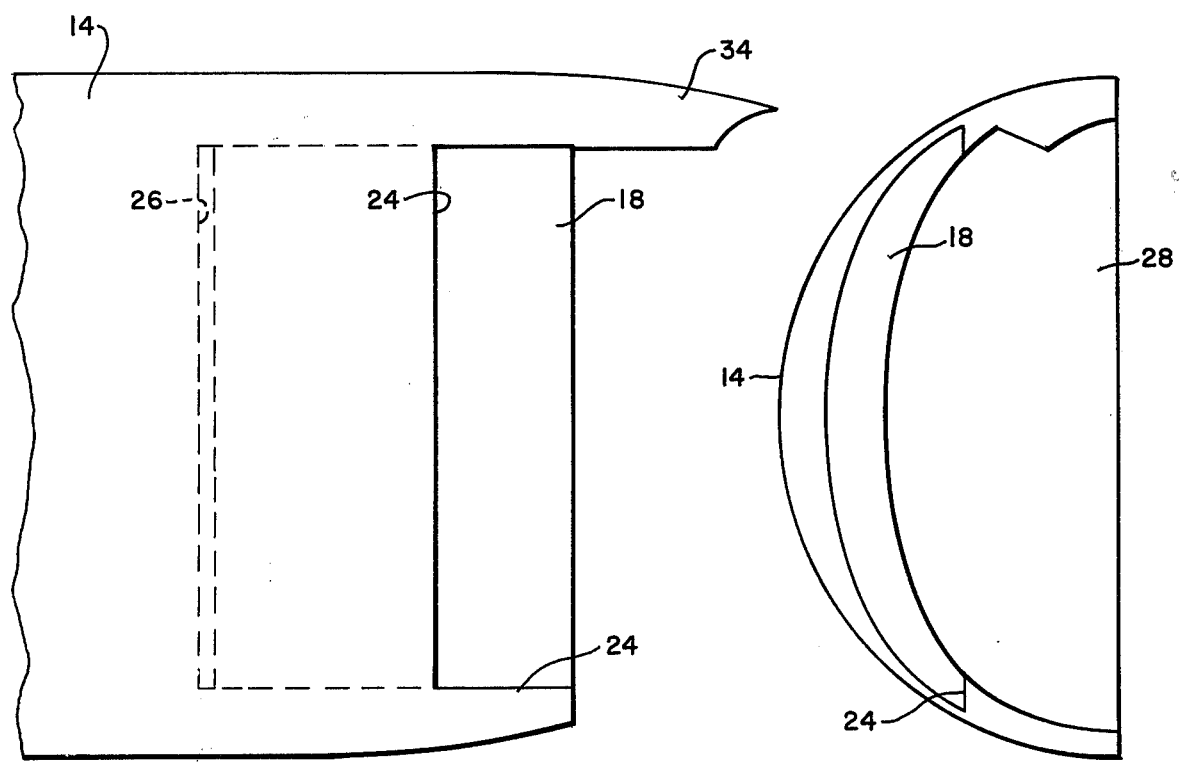
Fig. 4
Fig. 5

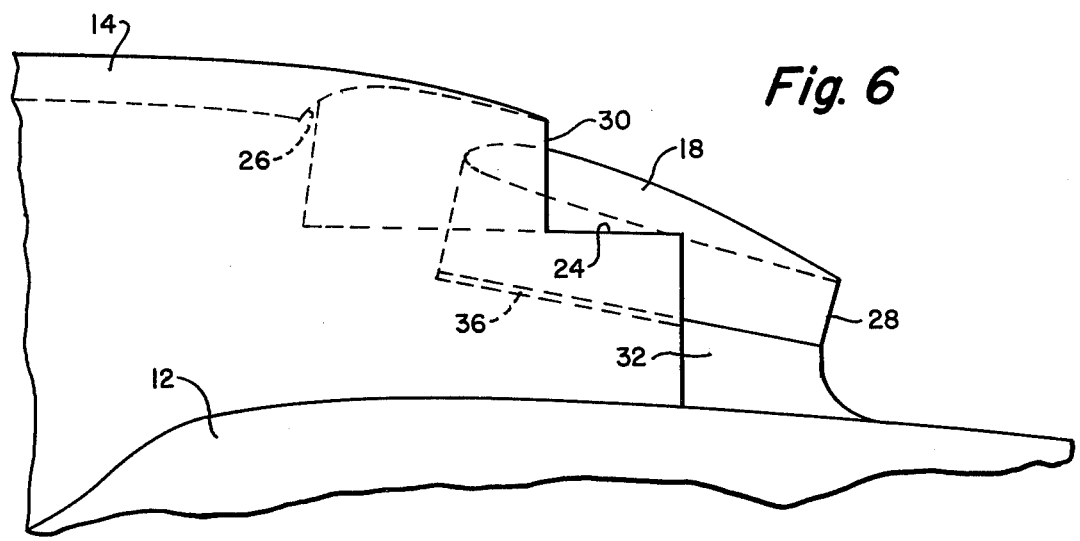
Fig. 6
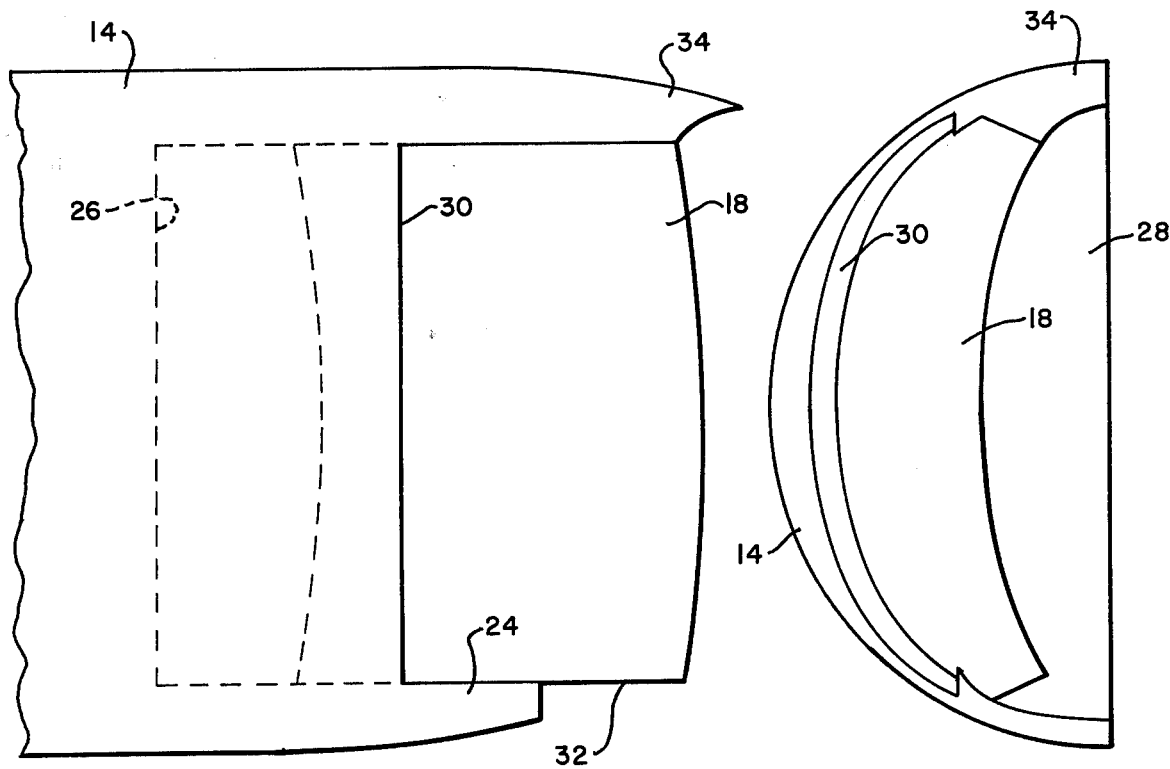
Fig. 7
Fig. 8

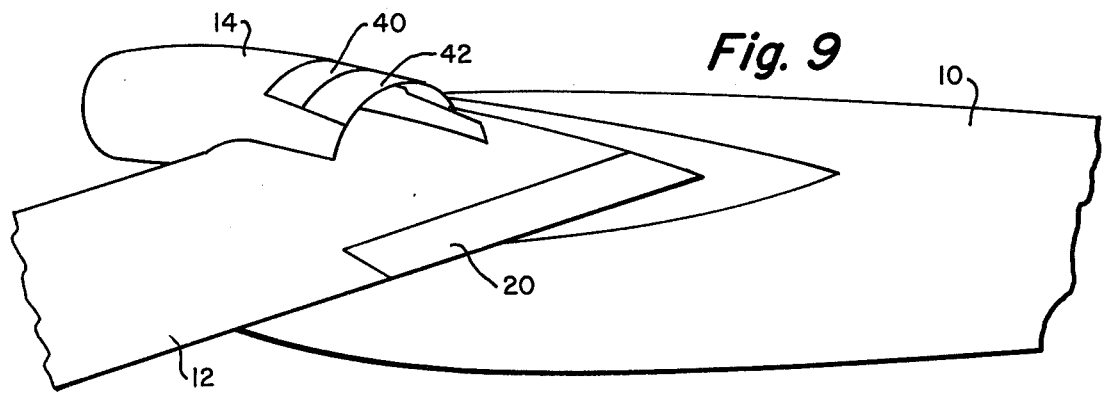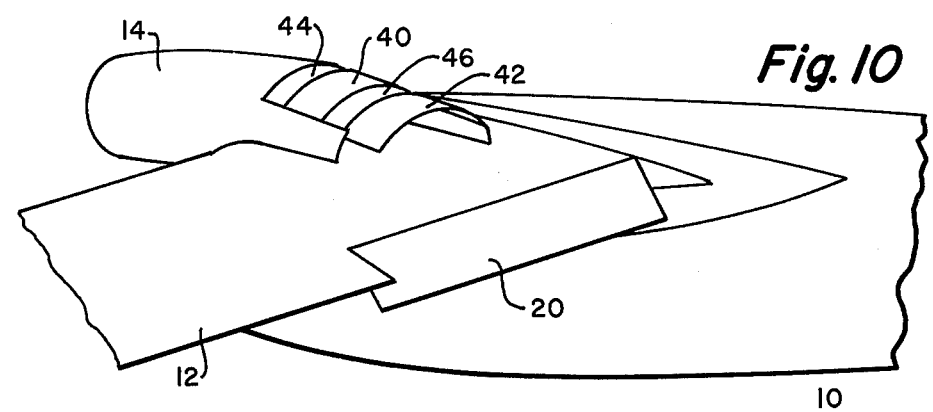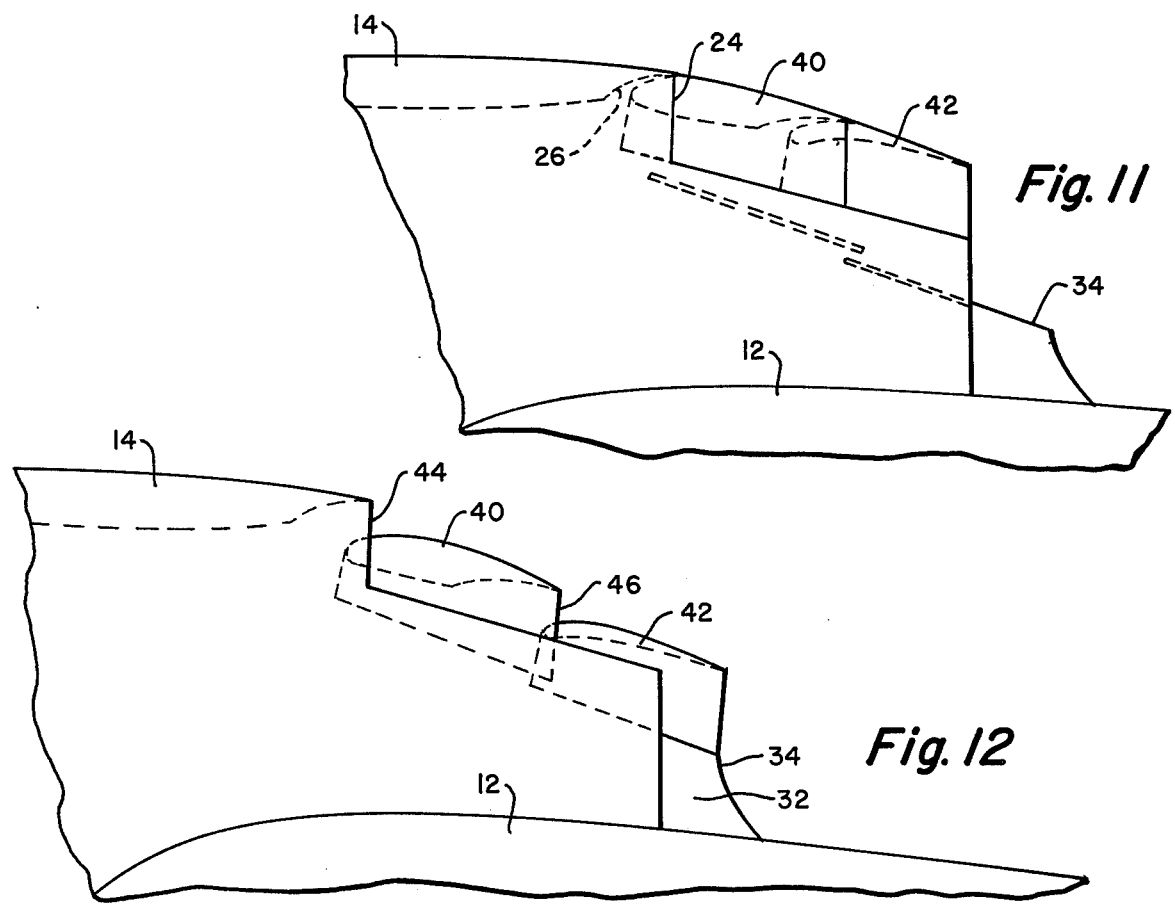

JET FLOW DEFLECTOR FOR AIRCRAFT

BACKGROUND OF THE INVENTION

The present invention relates generally to jet propulsion for aircraft, and more particularly, to a combined variable area nozzle and jet flow deflector for jet engines.

Modern aircraft are provided with jet propulsion means which usually consists of two or more jet engines disposed in engine nacelles mounted in or on the wings of the aircraft and having nozzles for directing the jet flow to the rear.

In many cases, the nozzle area or shape must be varied during flight to achieve superior performance under various flight conditions. This results from the combination of engine design factors and the differing requirements for low speed and high speed flight. Thus, a turbo fan engine with a relatively low design fan pressure ratio has a nozzle pressure ratio, with a confluent primary, ranging from approximately 1.3 at reduced power for low flight speeds to about 2.5 at full power for high subsonic flight speeds. If the nozzle has a relatively large convergence angle of the order of 20° or more, the discharge coefficient undergoes a variation of the order of 10% over this range of pressure ratios, which requires a variation of the nozzle area of the order of 10% to maintain acceptable engine performance.

Changes in the nozzle configuration are also required for different flight conditions. Thus, for low speed flight, the lift must be increased. This can be accomplished, utilizing the Coanda flap principle, by blowing the jet flow over the upper surface of the wing and a continuous surface flap, if the ratio of the jet height to the flap radius is low. This is best achieved with a nozzle configuration of high aspect ratio, such as an oblate or D-shaped nozzle, rather than a circular nozzle. In addition, spreading of the jet flow is required to maximize the portion of the wing area involved and thus the lift, and to minimize the jet thickness at the flap knee to achieve efficient turning of the flow. These requirements, of course, conflict with the requirements for high speed flight in which spreading of the jet flow must be minimized to reduce drag effects, and the jet flow must be directed straight aft of the aircraft clear of the wing surface.

It will be apparent that any attempt to meet these conflicting requirements with a fixed nozzle geometry would necessarily result in severe and usually unacceptable penalties on performance in one or more of the various possible sets of conditions. It has been proposed to use deflectors associated with the upper nozzle surface to deflect the jet flow downward for low speed flight, but this results in an unacceptable decrease in the nozzle area precisely in the situation where the nozzle area must increase. Other variable geometry schemes have also been proposed, involving variable nozzle side openings and various types of variable and retractable baffles and deflectors, in an attempt to achieve acceptable performance in the various flight regimes involved.

SUMMARY OF THE INVENTION

The present invention provides a combined variable area nozzle and jet flow deflector which meets the requirements discussed above in a simple and effective manner.

In accordance with the invention, a deflector member is provided which is shaped in such a manner that for high speed cruise conditions, the deflector fits into an opening in the upper part of the engine nacelle to form with the nacelle a complete nozzle of the proper shape to form an efficient flow passage. The upper or outside surface portion of the deflector is designed so that in this position the requirements for minimum drag during high speed cruise are met. For low speed flight conditions, the deflector is moved downward and aft with respect to the nacelle to a position where it deflects the jet flow downward to flow over the wing and wing flap to increase the lift by use of the Coanda flap principle. In this position, the deflector is spaced from the nacelle in a manner which opens an effective flow area between the nacelle and the upper surface of the deflector to increase the nozzle area and to approach the ideal nozzle shape. The upper surface of the deflector is designed to function as a Coanda surface to cause the flow over the deflector to flow downward and merge with the main jet flow through the nozzle. An additional side flow area is provided under the deflector and beyond the end of the nacelle which further increases the effective nozzle area as well as tending to promote the spreading of the jet flow which is necessary in this flight condition. If desired, the deflector may be divided into two or more segments which fit together and into the nacelle for high speed cruise, and which are separated and spaced from each other in the low speed configuration to enhance the effect and further increase the nozzle area.

BRIEF DESCRIPTION OF THE DRAWINGS

The invention will be more fully understood from the following detailed description, taken in connection with the accompanying drawings, in which:

FIGS. 3, 4 and 5 are, respectively, a side view, plan view and end view of an engine nacelle and deflector showing the deflector in high speed configuration;

FIGS. 6, 7 and 8 are views corresponding to FIGS. 3, 4 and 5, respectively, showing the deflector in the low speed configuration;

FIGS. 9 and 10 are somewhat diagrammatic perspective views of a portion of an aircraft showing a modified embodiment of the invention in the high speed and low speed configurations, respectively;

FIG. 11 is a side view of a nacelle and deflector means showing the modified embodiment of FIGS. 9 and 10 in the high speed configuration; and FIG. 12 is a view similar to FIG. 11 showing the deflector means in the low speed configuration.

DESCRIPTION OF THE PREFERRED EMBODIMENT

Figure 1:
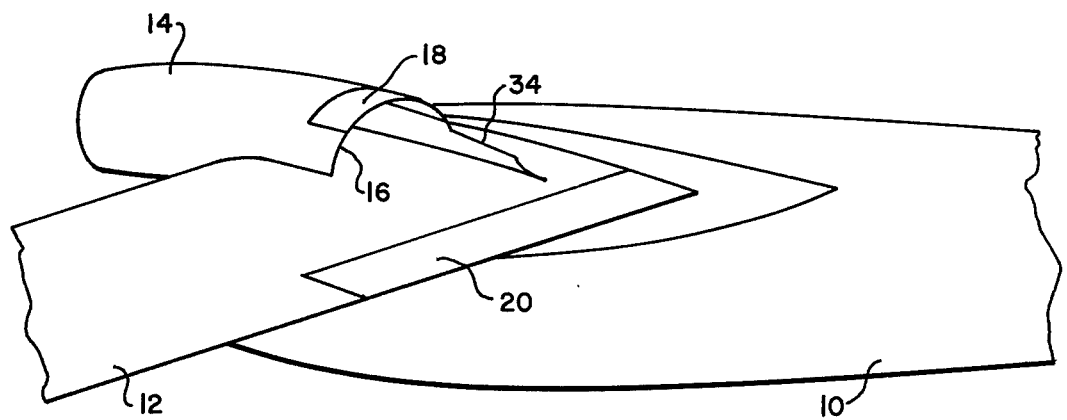
FIG. 1 is a somewhat diagrammatic perspective view of a portion of an aircraft embodying the invention and showing the jet deflector in the high speed cruise configuration.
Figure 2:
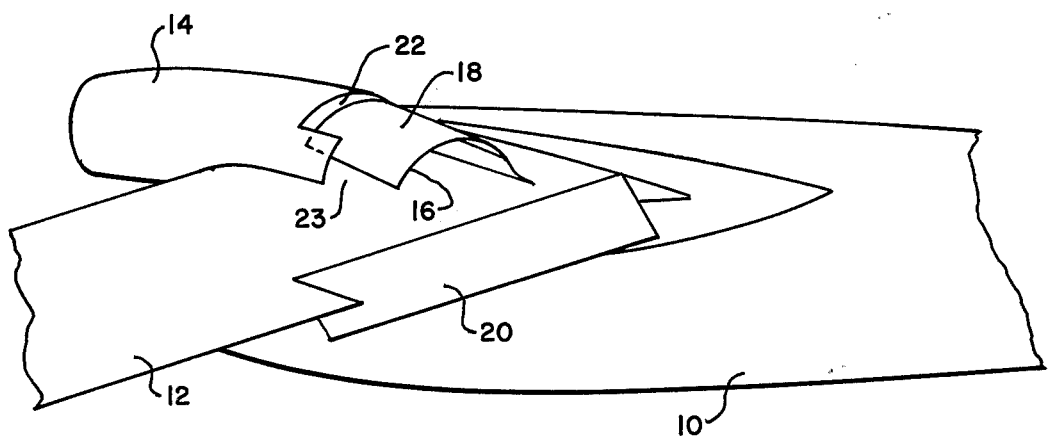
FIG. 2 is a perspective view similar to FIG. 1 showing the deflector in the low speed configuration.

Referring now to the drawings, and particularly to FIGS. 1 and 2, there is shown an illustrative embodiment of the invention in an aircraft having a fuselage, part of which is shown at 10, and a wing 12. The aircraft is provided with jet propulsion means comprising, in this case, a jet engine (not shown) disposed in an engine nacelle 14 mounted in the wing 12. As shown herein, the nacelle 14 is mounted in the leading edge of the wing in a manner to provide a rearwardly directed nozzle 16 of oblate or D-shape which directs the jet flow in the aft direction of the aircraft for propulsion. It will be understood, of course, that a similar nacelle and engine are mounted in the other wing of the aircraft. Any desired number of engines may be used in each nacelle and any desired number of nacelles may be provided.

In accordance with the present invention, the nacelle 14 carries a deflector member 18 which is shown in FIG. 1 in its position for high speed cruise conditions. In this position, the deflector 18 fits in an opening in the nacelle and forms a part of the jet nozzle 16 so that an effective flow passage is provided. For low speed conditions, such as during landing or takeoff, the deflector 18 is moved downwards and aft relative to the nacelle 14 to the position shown in FIG. 2. For these conditions, increased lift is required and is provided by use of the Coanda flap principle. For this purpose, the wing 12 carries a flap 20 which is retracted as shown in FIG. 1 during high speed flight but which is extended to the position shown in FIG. 2 for low speed flight conditions. As can be seen in FIG. 2, the D-shaped nozzle configuration and the position of the deflector 18 in the low speed configuration are such that the jet flow is deflected downward, and since the ratio of the jet's height to the radius of the flap 20 is relatively low, the jet flow is over the upper surface of the wing and the Coanda effect causes the flow to follow the surface of the flap and be deflected downward. In this way, increased lift is obtained. The configuration is also such that the jet flow spreads out across the wing and is coextensive with the flap 20. It will also be noted that in the position of the deflector 18 shown in FIG. 2, an additional flow area 22 is opened between the deflector 18 and the nacelle 14 so that the effective area of the nozzle is increased as required for the low speed flight conditions. Another additional flow area 23 is formed at the side which further increases the nozzle area and contributes to the spreading of the flow.

The actual construction of the deflector 18 and its relation to the nacelle 14 will be more clearly seen from FIGS. 3–8 of the drawings. Referring, first, to FIGS. 3, 4 and 5, the deflector is shown in its retracted position for high speed cruising flight. As shown in these figures, the deflector 18 is a member of generally airfoil cross section extending across the nacelle and curved to conform to the shape of the nacelle. The nacelle 14 has an opening 24 extending circumferentially in the aft edge of the nacelle, and has a recess 26 in its inner surface adjoining the opening 24. The leading edge of the deflector 18 is shaped as shown to engage the recess 26 and the inner surface of the deflector forms a substantially continuous interior surface with the upper part of the nacelle to provide an effective flow passage. The deflector 18 thus forms a part of the jet nozzle, and the nozzle opening 28 is substantially D-shaped as shown and provides an efficient flow passage for directing the jet flow in the aft direction of the aircraft substantially clear of the wing and with minimum spreading. The upper or outer surface of the deflector 18 is shaped as shown to engage in the recess 26 and the deflector fills the opening 24 so that the external surface of the nacelle provides minimum drag. In effect, this configuration permits the shape of the nacelle to be optimized for the high speed cruise requirements.

For low speed flight, such as during landing or takeoff where a lower speed and increased lift are required, the deflector 18 is moved to its extended position shown in FIGS. 6, 7 and 8. Any suitable type of mechanical linkage or other means (not shown) can be used to move the deflector 18 downwards and aft with respect to the nacelle 14, the deflector tilting somewhat as it moves as can be seen from FIG. 6. In the extended position the deflector 18 deflects the jet stream downward such that it flows across the wing surface and follows the surface of the flap 20 as discussed above to increase the lift. Movement of the deflector to this position reduces the effective area of the nozzle 28, but another flow area 30 is opened between the upper surface of the deflector 18 and the upper edge of the nacelle 14. This additional area provides a nearly ideal nozzle shape so that the effective flow area and the geometric area are essentially equal and the total nozzle area is thus increased as required for this mode of flight. The upper surface of the deflector 18 is somewhat curved and is shaped to act as an effective Coanda surface so that the jet flow over the deflector follows the upper surface and is thus deflected down to merge with the main jet flow through the main nozzle opening 28. The deflector 18 in the extended position of FIG. 6 extends beyond the end of the nacelle 14 and an additional flow area 32 is thus opened at the side which further increases the effective nozzle area and which also tends to increase the spreading of the jet flow A longitudinal extension 34 is preferably provided on the inboard side of the nacelle as shown. The extension 34 acts as a shield to minimize spreading of the jet flow in the inboard direction and thus reduces undesirable scrubbing of the flow against the fuselage. The extension 34 may also be formed and positioned so that the deflector 18 seats against it when the deflector is in the extended position of FIG. 6. A ledge 36 may be provided on the interior surface of the other side of the nacelle in a corresponding position to the extension 34 to serve as a seal and abutment for the deflector 18 on that side of the nacelle.

It will be seen that a deflector has been provided which in its retracted, or high speed, position forms an integral part of the nacelle and is disposed so that an efficient nozzle configuration is provided for jet flow, and so that optimum configuration of the nacelle can be achieved. In the extended or low speed position, the deflector provides the necessary increased effective nozzle area by opening the additional flow area 30, and deflects the jet flow downward to increase the lift. The decreased nozzle exit height, together with the side flow opening 32, force the jet flow to spread over the wing surface as desired. Thus, a relatively simple and very effective construction is provided for obtaining the desired performance of the aircraft in both high speed and low speed configurations.

It will, of course, be understood that various modifications of the invention are possible. Thus, for example, as shown in FIGS. 9–12, the deflector may be divided into a plurality of segments. As shown somewhat diagrammatically in FIGS. 9 and 10, the deflector in this embodiment consists of two segments 40 and 42, although any desired number of segments may be used. In the position of FIG. 9, which is the high speed configuration, the segments 40 and 42 form a part of the nacelle 14 providing an effective flow passage and smooth exterior surface in the same manner as described above. For low speed flight, the segments 40 and 42 are moved down and aft with respect to the nacelle and to each other, as shown in FIG. 10, to open additional flow areas 44 and 46 and to deflect the jet flow downward to flow across the wing in the manner previously described.

As shown more fully in FIG. 11, the nacelle 14 has a circumferential opening 24 in its rear edge and a recess 26 in its inner surface, as previously described, and the forward deflector segment 40 has its leading edge shaped to conform to the recess 26. The aft deflector segment 42 may be somewhat thinner and its leading edge is formed as shown to engage and conform to the rear edge of the deflector segment 40. The deflector segments thus engage the recess 26 and fill the opening 24 as in the previous embodiment. An effective flow passage is thus formed by the nacelle and the deflector segments, and the outer surface is smooth and may be made of optimum configuration for high speed flight.

For low speed flight with increased lift, the deflector segments 40 and 42 are moved to the extended position of FIGS. 10 and 12 in which the segments are moved downward and aft with respect to the nacelle and each other. In this position, the main jet flow is deflected downward to flow across the wing and to spread over the area of the flap 20, as previously described, and the deflector segments open additional flow areas 44 and 46 to increase the effective nozzle area. A side flow opening 32 is also opened at the rear of the nacelle to further increase the nozzle area and to enhance the spreading of the flow. An extension 34 may also be provided as previously described on the inboard side of the nacelle. The upper surfaces of the deflectors 40 and 42 are formed as Coanda surfaces in the same manner as the deflector 18, so that the jet flow over the outer surfaces of the deflector segments flows downward and merges with the main jet stream. It will be seen that the operation of the embodiment of the invention shown in FIGS. 9–12 is essentially similar to that of the previous embodiment, but that the provision of two or more deflector segments results in a corresponding number of additional flow areas above the deflectors, and thus further increases the effective flow area, as well as permitting greater flexibility in design.

The invention has been described with reference to a single engine nacelle but it will, of course, be understood that the construction described will be applied to each of the nacelles of a multi-engine craft. Certain specific embodiments of the invention have been shown and described for the purpose of illustration but it will be obvious that various other embodiments and modifications are possible within the scope of the invention.

I claim as my invention:

1. In an aircraft having jet propulsion means, a nacelle mounted in a wing of the aircraft and containing said propulsion means, said nacelle providing a nozzle at its end portion for discharging a jet flow in the aft direction of the aircraft, and deflector means on the nacelle movable between first and second positions, the deflector means engaging the nacelle at the aft end thereof in its first position to form a continuous interior surface with the nacelle constituting a part of said nozzle, and the deflector means being movable downwards and aft relative to the nacelle to its second position in which the deflector means deflects the jet flow downward and is spaced from the nacelle to provide additional jet flow in the aft direction over the deflector means between the nacelle and the upper surface of the deflector means to increase the effective nozzle area.

2. The combination of claim 1 in which the upper surface of the deflector means is shaped to function as a Coanda surface.

3. The combination of claim 1 in which the deflector means in its second position extends beyond the end of the nacelle to provide a further area for jet flow at one side of the deflector means.

4. The combination of claim 1 in which the deflector means is a curved member adapted to engage a recess in the upper part of the nacelle in said first position to form with the nacelle an effective nozzle for jet flow, and said member being spaced from the nacelle in said second position to form an open flow area for jet flow between the nacelle and the upper surface of the member, said surface being shaped as a Coanda surface to cause said last-mentioned jet flow to flow downward to merge with the main flow from the nacelle.

5. The combination of claim 1 in which the deflector means comprises a plurality of curved segments disposed side-by-side and adapted to engage the nacelle and each other in said first position to form with the nacelle an effective nozzle for jet flow, and said segments being displaced downwards and aft relative to the nacelle and to each other in said second position to deflect downward the main jet flow through said nozzle and to provide open flow areas for jet flow over the upper surfaces of the segments.

6. The combination of claim 5 in which said segments engage a recess in the upper part of the nacelle and each other in said first position in a manner to form with the nacelle an effective nozzle for jet flow, and in which said upper surfaces of the segments are shaped as Coanda surfaces to cause the flow over said surfaces in said second position to flow downward to merge with the main jet flow.

7. In an aircraft having jet propulsion means, a nacelle mounted in a wing of the aircraft and containing said propulsion means, said nacelle having its end portion formed to provide a nozzle for discharging a jet flow in the aft direction of the aircraft, said end portion of the nacelle having a recess in the upper part thereof adjoining a circumferential opening in the aft edge of the nacelle, a curved deflector on the nacelle, said deflector having a first position in which it engages in said recess and closes said opening, the configuration of the deflector being such that in said first position it forms with the nacelle a continuous interior surface providing a single effective flow passage for the entire jet flow and the upper surface of the deflector forming with the nacelle a smooth continuous exterior surface, and the deflector having a second position in which it is displaced downwards of the nacelle and aft from the first position to deflect the jet flow downward and to provide an open flow area between the upper surface of the deflector and the nacelle to provide additional jet flow in the aft direction over the upper surface of the deflector to increase the effective nozzle area.

8. The combination of claim 7 in which said upper surface of the deflector is shaped to function as a Coanda surface to cause jet flow through said open flow area to follow said surface and merge with flow through the nozzle.

9. The combination of claim 7 in which said deflector in the second position provides a further flow area at one side thereof and beyond the end of the nacelle.

10. The combination of claim 9 in which the nacelle has an extension at the other side thereof in position to be engaged by the deflector member in its second position.

11. The combination of claim 7 in which the deflector comprises a plurality of curved segments engaging each other and the nacelle in said first position to close said opening, said segments being spaced from the nacelle and each other in said second position to provide areas for jet flow over the upper surfaces of the segments.

12. The combination of claim 11 in which the upper surfaces of the segments are shaped to function as Coanda surfaces to cause the flows over said surfaces to flow downward and merge with the main jet flow through the nozzle.

* * * * *